Sept. 8, 1936.   J. P. SCHIELEIN   2,053,535
LAWN MOWER
Filed July 8, 1935
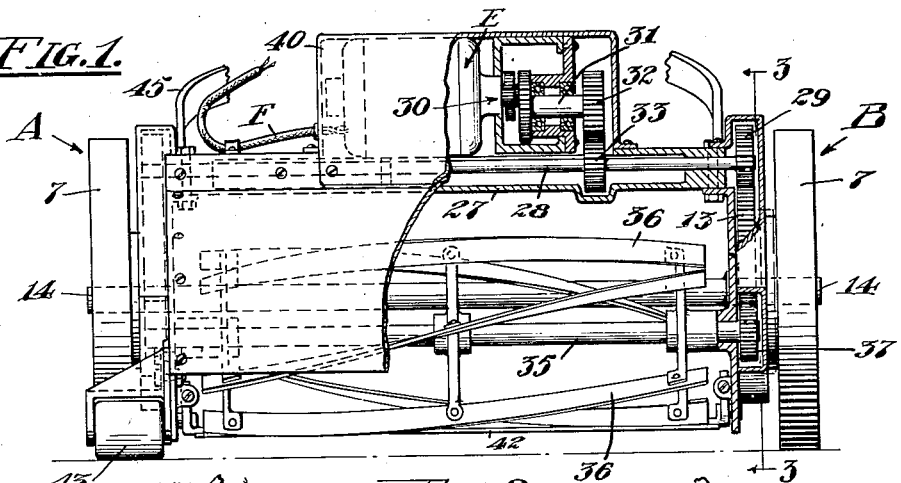
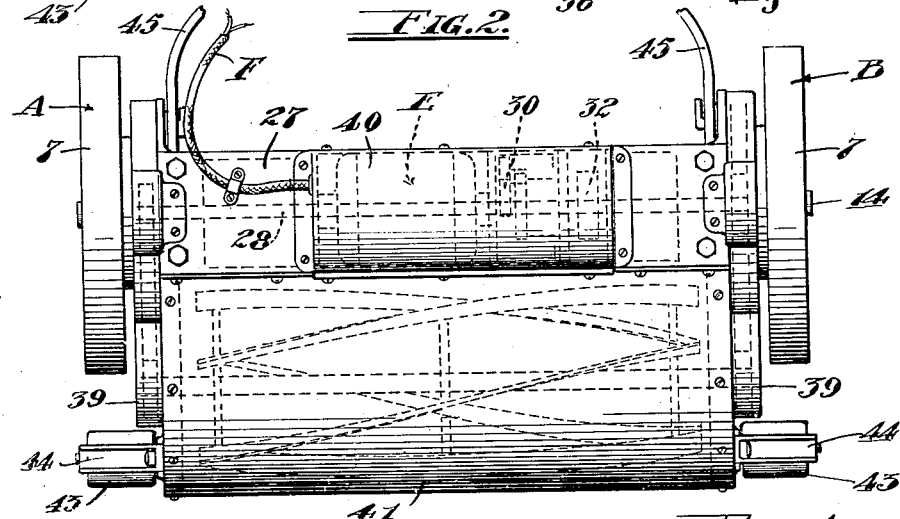
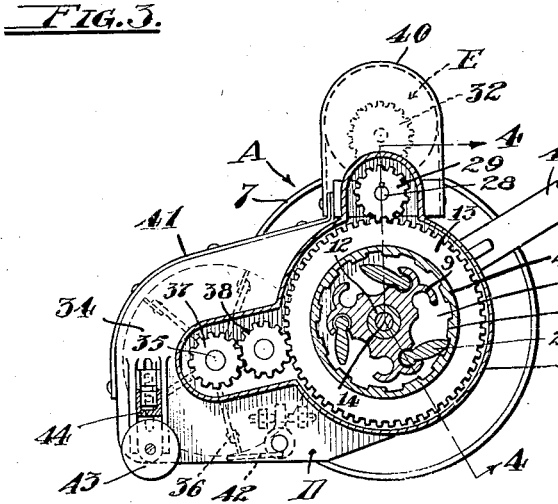
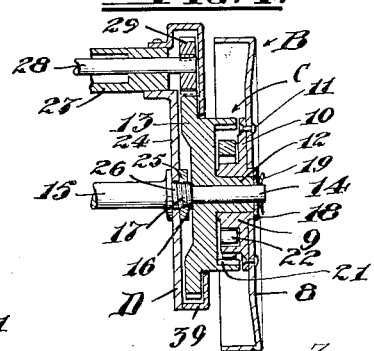
Inventor
John P. Schielein
By R. L. Bump
Atty.

Patented Sept. 8, 1936

2,053,535

UNITED STATES PATENT OFFICE 2,053,535

LAWN MOWER

John P. Schielein, Los Angeles, Calif.

Application July 8, 1935, Serial No. 30,265

6 Claims. (Cl. 56—26)

This invention relates to a lawn mower and more particularly pertains to lawn mowers of the manually impelled type including a revoluble cutter; the primary object of the invention being to provide a motor drive for the cutter adapted to operate the latter independent of the running gear of the mower whereby a lawn mower is produced which is adapted to be manually impelled and the cutting blades power driven thereby overcoming objectionable features incident to the ordinary manually operated type of lawn mower in which the propulsion of the rotary cutter is effected through a driving connection from the traction wheels of the mower, and also incident to power driven lawn mowers in which both the traction wheels and the cutter are motor actuated.

Another object is to provide a manually impelled lawn mower having a power driven cutter in which operation of the cutter will assist but not effect forward movement of the mower during mowing operations whereby a minimum of manual effort is required in manipulating the mower.

Another object is to provide a lawn mower with a power driven cutter so operated as to be subject to control without the aid of clutch mechanism and in which the cutter may be placed in operation independent of movement of the mower by merely manipulating an electrical switch.

Another object is to provide a lawn mower in which a power driven cutter is arranged to project forward of the traction wheels of the mower so as to permit operation of the mower to effect a mowing action close to edges of lawns, bordered by upstanding edgings such as, curbs, walls and border plants.

A further object is to provide an arrangement in a lawn mower of the above character whereby the cutter may be driven either by motive power or from the traction wheels of the mower thereby rendering the mower convertible from a power driven to a manually driven cutter.

Another object is to provide a chassis for the lawn mower so constructed as to afford a substantial mounting for the cutter and its operating mechanism, embodying a housing or cover arrangement affording a guard for the cutter and protection of the mechanism from cuttings.

Various additional objects and features of the invention will appear and will be more fully understood from the following detailed description of a present preferred embodiment thereof, reference for this purpose being had to the accompanying drawing, in which:

Fig. 1 is a view of the mower as seen in front elevation partly in vertical section:

Fig. 2 is a plan view of the mower:

Fig. 3 is a view in section and elevation taken on the line 3—3 of Fig. 1 as seen in the direction indicated by the arrows:

Fig. 4 is a detail in section as seen on the line 4—4 of Fig. 3 in the direction indicated by the arrows.

Referring to the drawing more specifically A and B indicate a pair of traction wheels each of which embodies an annular rim 7, a disk 8 and a hub 9; the rim and disk being here shown as formed integral and the hub being shown as embodying a flange 10 affixed to the disk 8 by rivets 11 with the hub projecting from the inner face of the disk 8 in a manner common in lawn mower wheel construction.

In carrying out the present invention each of the wheels A and B are revolubly mounted on the hub 12 of a gear wheel 13 which latter is arranged on the inner side of the wheel with its hub 12 extending through the hub 9 of the latter. The gear wheels 13 are journaled on axles 14 formed on the ends of a shaft 15. The inner faces of the gear wheels 13 slidably abut against shoulders 16 at the outer ends of exteriorly threaded collars 17 formed at the inner ends of the axles 14. Mounted on the outer ends of the axles are washers 18 held in place by cotter pins 19, which washers overlie and slidably abut the hubs 9 and 12 whereby the traction wheels and gear wheels are collectively retained on the axles 14. The traction wheels and gear wheels are designed normally to be revoluble in either direction independent of each other excepting as to tendency of rotation of the gear wheels 13 to effect rotation of the traction wheel by reason of frictional engagement between the hubs thereof but in order to prevent driving of the gear wheels 13 on advance rotation of the traction wheels, an overrunning clutch C is interposed between each of the traction wheels and its associated gear wheel, which clutch is here shown as embodying an annular flange 20 formed on the gear wheel 13 and having a series of teeth 21 on its inner periphery adapted to be engaged by a series of pawls 22 pivotally supported on the hub 9 as particularly shown in Fig. 3; the pawls 22 extending in such direction as to permit free rotation of the gear wheels 13 in the direction of forward movement of the traction wheels relative to the latter and being supported to gravitate into engagement with the teeth 21 to effect engagement therewith so that forward turning of the traction wheels may effect rotation of the gear wheels in unison therewith when it is desired to effect driving of the gear wheels from the traction wheels. Manifestly the overrunning clutches permit retrograde movement of the traction wheels independent of the gear wheels.

Carried on each end portion of the shaft 15 is a frame member D constituting a part of the mower chassis and which member embodies a plate 24 projecting over the inner face of the gear wheel 13 and formed with an opening through which the threaded collar 17 extends; the member D being held in place on the shaft 15 by a nut 25 screwed on the collar 17 and clamping the plate 24 against a flange 26 on the shaft 15.

The upper end portions of the frame members D are connected together by a tubular frame member 27 through which extends longitudinally a revoluble shaft 28 journalled in the end portions of the member 27 and having pinions 29 on the outer ends thereof which mesh with the gear wheels 13, and supported on the frame member 27 is an electric motor E which is geared to the shaft 28 through a series of speed reduction gears 30 affording a driving connection between the motor drive shaft and a stub shaft 31 which latter is fitted with a gear wheel 32 meshing with a gear wheel 33 on the shaft 28. An electrical conductor F leads from the motor E to any suitable source of electrical current supply.

The plate 24 of each of the frame members D is formed with a forwardly projecting portion 34, as particularly shown in Fig. 3, and journalled in such portions is a revoluble shaft 35 carrying a series of spaced spirally arranged cutting blades 36 in a fashion common to lawn mower construction. The ends of the shaft 35 are fitted with pinions 37 meshing with idler gears 38 which in turn intermesh with the gear wheels 13.

Each frame member D embodies a demountable cover portion 39 which encompasses the marginal portion of the gear 13 and houses the gears 29, 37, and 38. The motor E and its gear connections to the shaft 28 are encased in a housing 40 and projecting over the cutter 36 is a cover plate 41 extending between the plates 24 and leading from the frame member 27 forwardly and downwardly in front of the cutter with its outer lower margin spaced from the lower peripheral portion of the cutter.

Associated with the cutter blades 36 is a stationary blade 42 which is carried on the plates 24, which blade cooperates with the blades 36 to effect a cutting action as is common in lawn mower construction.

It will be noted that in the arrangement shown the cutter comprising the blades 36 is disposed so as to project forwardly of the traction wheels A and B. As a means for maintaining the cutter in spaced relation to the ground and also for adjusting the spacing of the blades relative to the ground a pair of rollers 43 are mounted on the frame members D to contact the ground forward of the traction wheels A and B; the wheels 43 being carried on slide blocks 44 mounted for vertical adjustment on the extensions 34 of the plates 24.

The mower is equipped with a handle (not shown) connected thereto through the medium of yoke members 45 in a manner common in lawn mower construction.

In the operation of the invention, on placing the motor E in operation, the shaft 28 will be driven through the reduction gears 30, shaft 31, and gears 32 and 33, driving of the shaft 28 will effect driving of the gear wheels 13 through the pinion 29, and rotation of the gear wheels 13 will operate through the idler gears 38 to drive the gears 37 and thereby rotate the blade carrying shaft 35 thus revolving the mower blades 36, which latter rotate in a direction corresponding to the direction of rotation of the traction wheels A and B on advancing the lawn mower. The mower may be easily advanced and retracted by the operator and quickly stopped at the ends of the strokes thus permitting operation of the mower in a fashion similar to that employed in operating the ordinary carpet sweepers.

During the driving of the gears 13 from the motor they will be driven at a peripheral speed exceeding that of the traction wheels A and B during forward movement of the mower at usual speeds, and accordingly manual impelling of the mower in a forward direction will be permitted while the motor E is in operation.

However, when the motor E is stationary forward movement of the mower will be opposed by reason of the pawls 22 of the clutch C when engaging the teeth 21 of the gear wheels 13 so that the latter will rotate in unison with the traction wheels A and B against resistance of driving of the blades 36 and turning over of the motor E from the gear wheel 13. The resistance to rotation of the gear wheel 13 is then so great as to render difficult the manual impelling of the motor forwardly. However retrograde movement of the mower may be readily effected since the pawls 22 will then ride over the teeth 21 on retrograde rotation of the traction wheels.

In event it is desired to effect driving of the mower from the traction wheels the driving connection between the motor and the gear wheels 13 is placed out of operation as by detaching the pinions 29 from the shaft 28.

By positioning the cutting blades forward of the traction wheels the mower is adapted to effect a cutting action close to walls, edgings, trees and other upstanding objects on advancing the mower adjacent thereto.

I claim:

1. In a lawn mower, a pair of traction wheels, gear wheels having hubs on which said traction wheels are journalled, a shaft, axles on said shaft on which said gear wheels and traction wheels are collectively carried, a frame carried by said axle, a revoluble cutter mounted on said frame projecting forwardly of said traction wheels, gear connections between said gear wheels and said cutter for driving the latter, a motor carried by said frame, and means for driving said gear wheels from said motor.

2. The structure called for in claim 1 including overrunning clutches interposed between said traction wheels and said gear wheels.

3. In a lawn mower, a pair of traction wheels, gear wheels having hubs on which said traction wheels are journalled in sliding frictional contact with said hubs, a shaft, axles on said shaft on which said gear wheels and traction wheels are collectively carried, a frame carried by said axle, a revoluble cutter mounted on said frame projecting forwardly of said traction wheels, gear connections between said gear wheels and said cutter for driving the latter, a motor carried by said frame, and means for driving said gear wheels from said motor.

4. In a lawn mower, a pair of spaced housings, a shaft to which said housings are affixed, axles on the ends of said shaft, gear wheels journalled on said axles arranged in said housings, a revoluble cutter carried by said housings, said cutter being arranged to project forwardly of said gear wheels, gear connections between said cutter and said gear wheels, a motor carried by said housings, means for driving said gear wheels from said motor, and a pair of traction wheels mounted on said axles.

5. In a lawn mower, a pair of spaced housings, a shaft to which said housings are affixed, axles on the ends of said shaft, gear wheels journalled on said axles arranged in said housings, a revoluble cutter carried by said housings, gear connections between said cutter and said gear wheels, a motor carried by said housings, means for driving said gear wheels from said motor, a pair of traction wheels mounted on said axles, said cutter being arranged to project forwardly of said gear wheels, and rollers carried by said housings forwardly of said traction wheels cooperating with the latter to support said cutter in spaced relation to the ground.

6. In a lawn mower, a pair of spaced housings, a shaft to which said housings are affixed, axles on the ends of said shaft, gear wheels journalled on said axles arranged in said housings, a revoluble cutter carried by said housings, said cutter being arranged to project forwardly of said gear wheels, gear connections between said cutter and said gear wheels, a motor carried by said housings, means for driving said gear wheels from said motor, a pair of traction wheels mounted on said axles, and a guard housing extending over said cutter and projecting downwardly in front thereof.

JOHN P. SCHIELEIN.